Jan. 3, 1956 W. DANZIGER 2,729,400
CABLE REEL MECHANISM
Original Filed Sept. 1, 1950 5 Sheets-Sheet 1

INVENTOR
WILLIAM DANZIGER

BY
ATTORNEYS

INVENTOR
WILLIAM DANZIGER

Jan. 3, 1956 W. DANZIGER 2,729,400
CABLE REEL MECHANISM
Original Filed Sept. 1, 1950 5 Sheets-Sheet 4

INVENTOR
WILLIAM DANZIGER

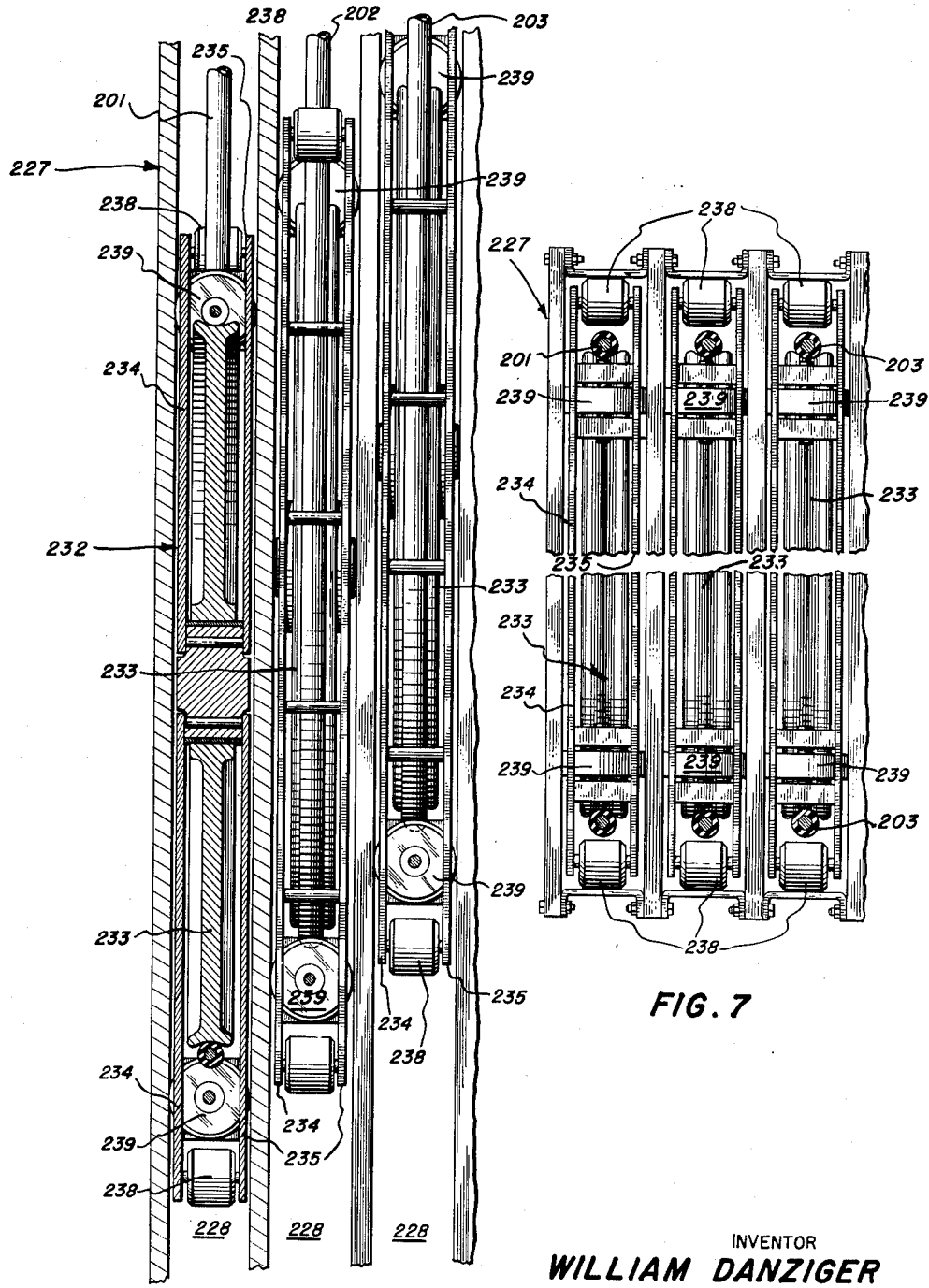

United States Patent Office 2,729,400
Patented Jan. 3, 1956

2,729,400

CABLE REEL MECHANISM

William Danziger, Franklin Square, N. Y.

Original application September 1, 1950, Serial No. 182,696. Divided and this application February 16, 1954, Serial No. 410,468

5 Claims. (Cl. 242—47.5)

(Granted under Title 35, U. S. Code (1952), sec. 266)

The invention described herein may be manufactured and used by or for the Government of the United States of America for governmental purposes without the payment of any royalties thereon or therefor.

This invention relates to cable reel mechanism and more particularly to electric cable reel mechanisms which are automatic in operation and may be employed for connecting electrically actuated mechanisms on a rotatable mount with electrical control devices on a stationary mount in such a manner that the cables will be maintained in a desired disposition regardless of relative rotational movement between the two mounts.

This application is a division of application Serial No. 182,696, filed September 1, 1950, for Missile Launcher which is directed to a combination of several inventions by joint inventors, of whom the present inventor is one and the present application disclosing and claiming one of the inventions of the parent application.

In the art of modern warefare the use of self-powered missiles such as rockets has been receiving increasing attention, however, difficulties have been encountered in the handling and launching of such missiles particularly when it is desired to launch a number of them in rapid succession and/or at different elevation and train settings.

Heretofore, one of the difficulties encountered in launching a multiplicity of rockets has been the twisting and fouling of electric cables which connect electrical devices on the stationary portion of the launcher to those on the moveable portion, particularly when the launcher was moved in train and/or elevation. This often resulted in time consuming delays in launching programs while the cables were freed or untangled.

The cable reel mechanism of the present invention overcomes the above and other limitations of prior art devices and is particularly adapted for use with missle launchers on naval vessels where space limitations are important, however, it will be understood that it is not limited to such use but may be used in other installations where a launcher of this character is desired, or in any type of installation where electrical cables may be required to connect elements on two structures which rotate relative to one another.

Accordingly, it is an object of the present invention to provide an improved cable reel mechanism which provides optimum control of the cable during relative rotation of two structures between which the cables are connected, is rapid in action and avoids the hazards and disadvantages incident to the use of conventional cable handling devices.

A further object of the present invention is to provide a cable reel mechanism that may be completely automatic in operation while the rotatable mount of a missile launcher, for example is controled from a remote station by conventional fire control equipment.

A further object is the provision of an improved cable reel mechanism wherein the structural relationship between the above-deck mount and below-deck magazine and hoist may be varied to conform with structural and space limitations of various naval vessels upon which a missile launching system employing the present invention may be installed.

Still another object is the provision of a novel reeling device which eliminates twisting, fouling or straining of flexible cable members interconnecting relatively moveable members.

Other objects and many of the attendant advantages of this invention will be readily appreciated as the same becomes better understood by reference to the following detailed description when considered in connection with the accompanying drawings wherein:

Fig. 6 is an enlarged detailed elevational view partially in vertical section of the cable well and follower shown in Fig. 5; and Fig. 7 is a foreshortened top plan view of the followers of Figs. 5 and 6.

Figure 1:
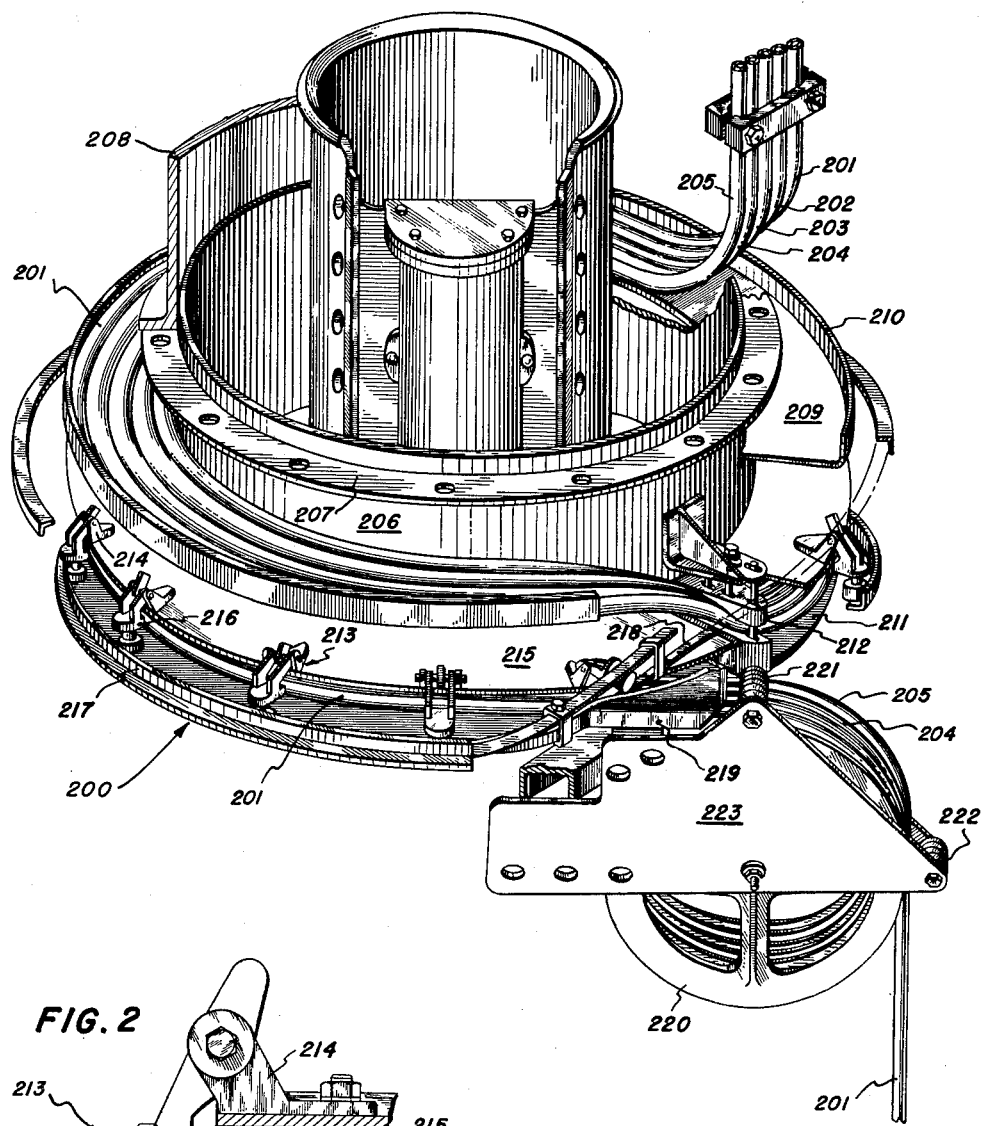
Fig. 1 is a perspective view from above of the cable reel of the present invention which is employed to pay out and take up slack in the electrical cables connected to the rotatable mount and prevent fouling thereof during rotation of the mount.

The present invention is shown as an automatic operating cable reel mechanism for a shipboard type of missile launcher installation wherein all componets of the reel mechanism are protected by enclosure within a shield or by location below deck.

In one application of the embodiment illustrated, a single launcher guide tube is supported by trunnions for pivotal movement from an upright loading position to an inclined firing position at which time it is lowered to some angle between 0° and 60° of elevation as determined by a signal received from the ship's gun director. This guide tube and its trunnions are mounted upon a carriage supported upon a mount which is similar to the conventional 40 mm. gun mount and includes the necessary apparatus for moving the guide tube both in train and elevation in response to director signals received from conventional fire control equipment. By this means the mount may be moved in train and in elevation so that it may bear upon the target up to the very instant of firing, and by the employment of the cable reel mechanism of the present invention such movements of train and elevation may be completed rapidly and effectively without any tendency for the electric cables to become tangled and fouled during such movements.

In the embodiment of the invention illustrated, the present cable reel mechanism is disclosed in association with an automatic missile launcher as shown in the aforementioned copending application Serial No. 182,696, filed September 1, 1950, for Missile Launcher, which launcher may be installed on a naval vessel with an above-deck mount, a below-deck ready service magazine and a missile hoisting mechanism adapted to convey missiles from the magazine directly into a missile guide tube carried by the mount.

The electrical connections for the above-deck mount including the train and elevating motor power circuits and the control systems are carried by way of the cable reel mechanism of the present invention, generally designated by 200, through a number of electrical cables of which five are employed in the embodiment illustrated. In the present embodiment as shown in Figs. 1 through 7 these cables have been numbered 201, 202, 203, 204 and 205 and descend through the lower deck of the above-deck mount and are collected and supported by the cable reel mechanism which protects them against abrasion and supports them against strain or twisting which might occur during rotation of the above-deck mount. This cable reel device comprises a hoist encircling drum 206 having a flange 207 about its upper edge which latter is provided with a plurality of equidistantly spaced bolt openings therethrough adapted to register with corresponding openings in a radially extending flange 208 encircling the lower edge of the base ring 126 (see Fig. 4) of the rotatable mount. With flanges 207 and 208 bolted together the drum is carried by the mount in rotation.

The cable reel drum 206 supports a radial shelf 209 having an upturned edge 210 upon which shelf the cables 201 through 205 lay as they encompass the drum. The shelf 209 is interrupted to provide an opening through which the cables descend to a lower shelf 211 and in this opening is located a cable clamp 212. The shelf 211 may be continuous and, since it too is secured on and rotates with the drum, there is no relative rotation between the cable and the shelf.

Figure 2:
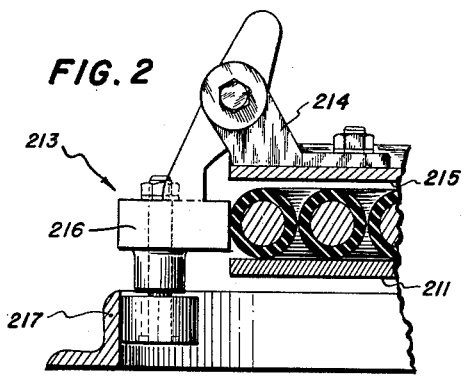
Fig. 2 is an enlarged detailed vertical section of one of the cable engaging dogs used in the reel of Fig. 1.
Figure 3:
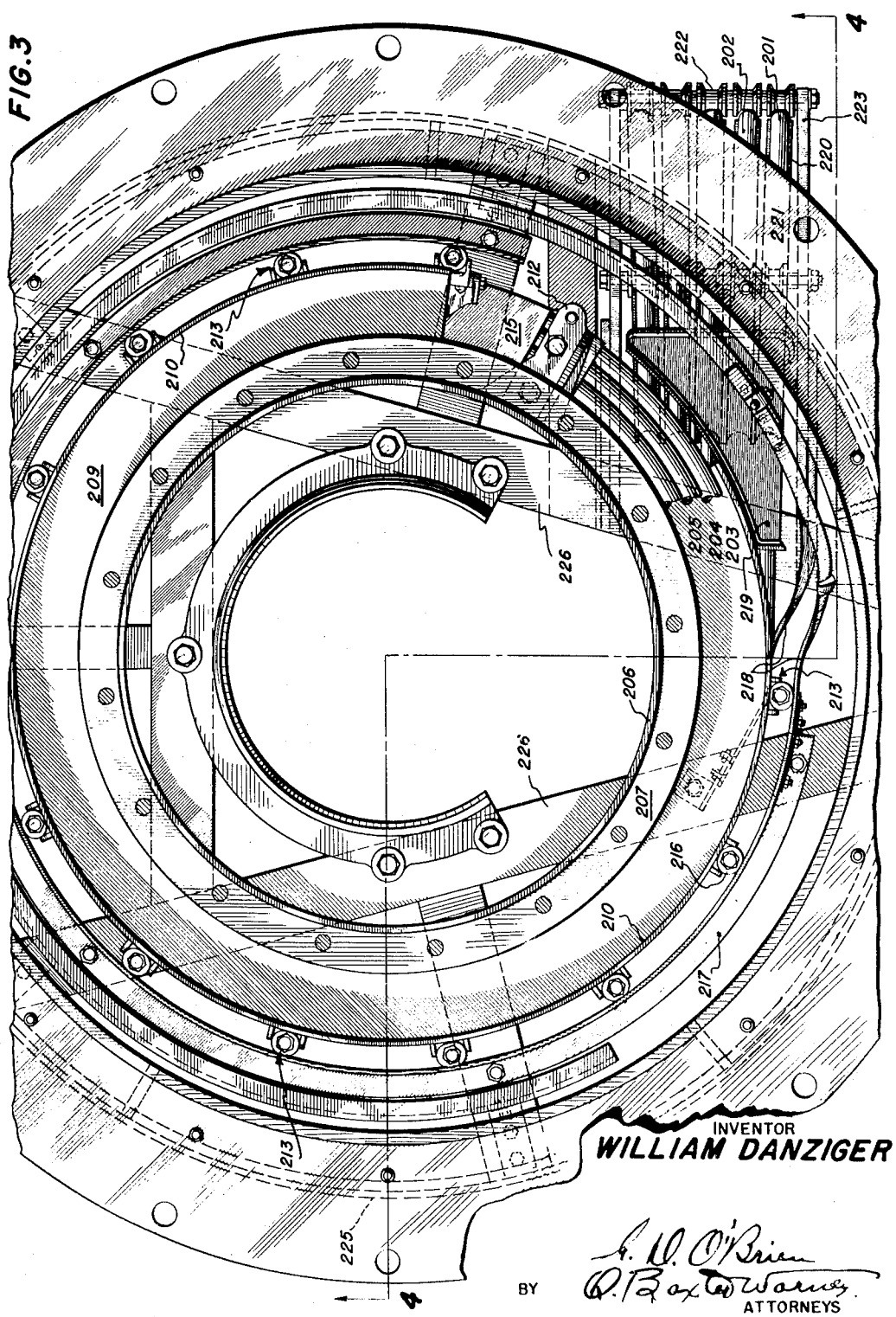
Fig. 3 is an enlarged top plan view of the cable reel of Fig. 1.
Figure 4:
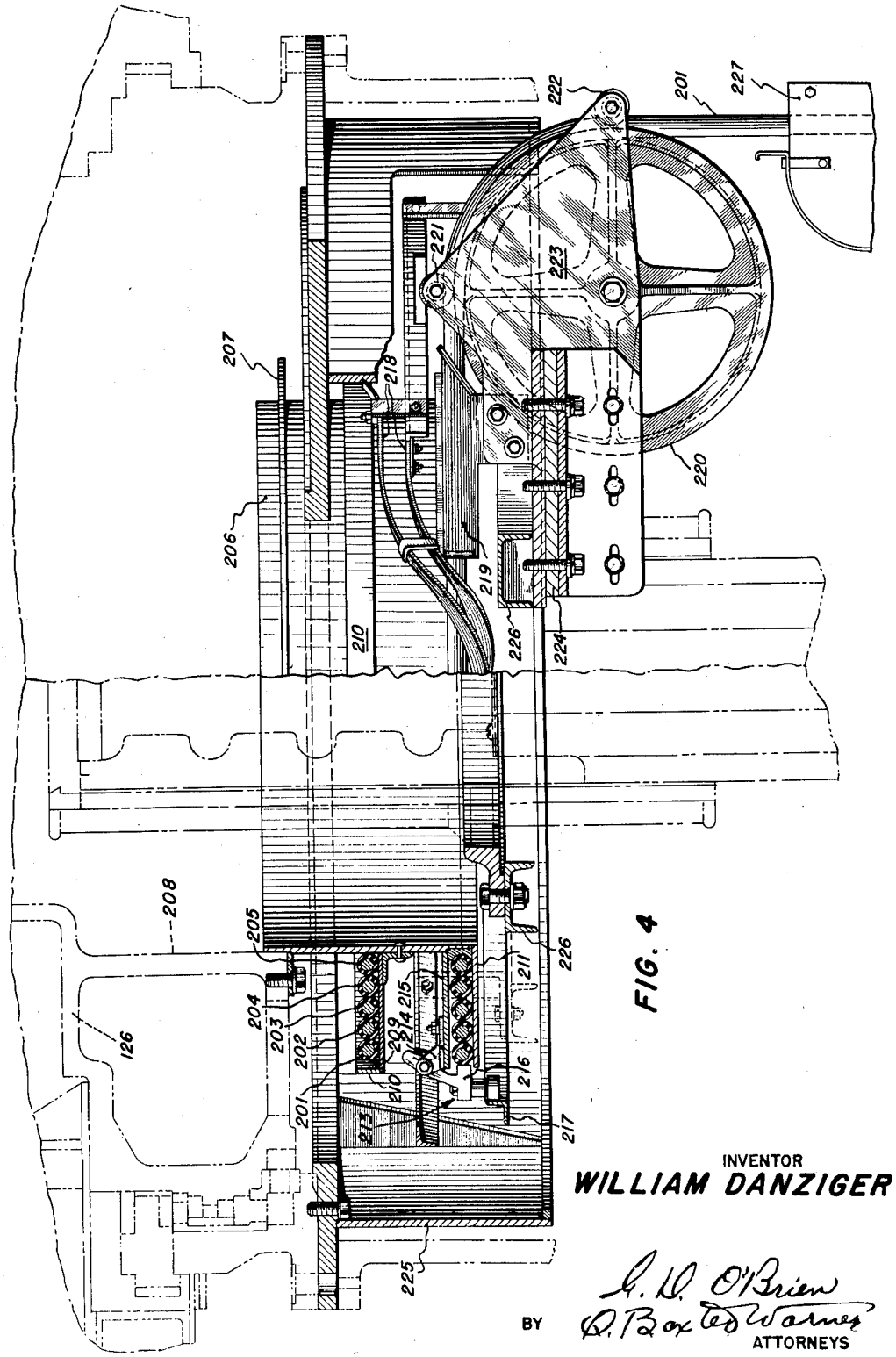
Fig. 4 is a side elevation partially in section of the cable reel illustrated in Figs. 1 and 3 taken along a line substantially corresponding to line 4—4 of Fig. 3.
Figure 5:
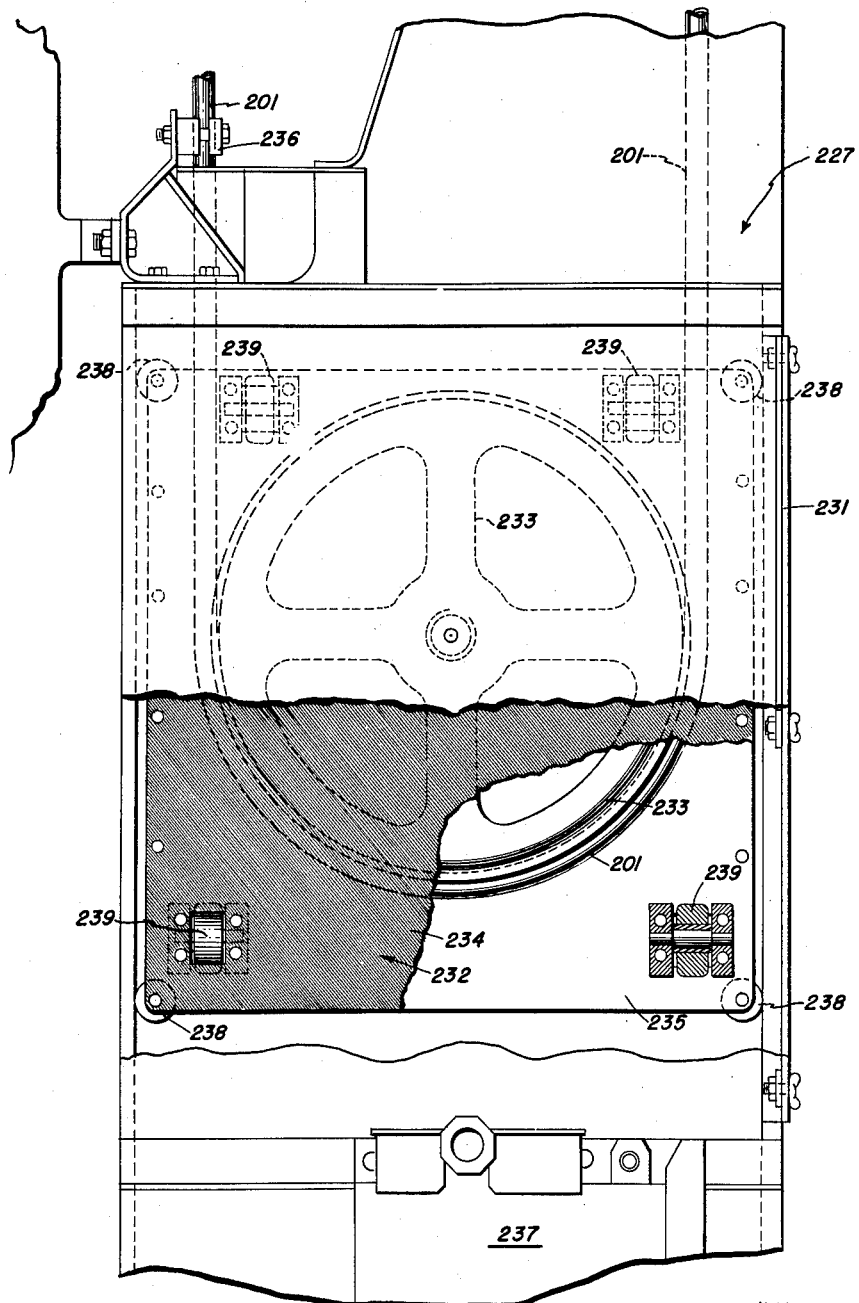
Fig. 5 is an enlarged fragmentary side elevation of a cable well and follower with portions of both the well wall and the follower side broken away.

As the cable drum rotates, the cables are fed tangentially on and off this lower shelf 211 by a pulley arrangement shortly to be described. As shown in Figs. 1, 2 and 4, the cables are retained in a close side by side relationship on the lower shelf by a plurality of equally spaced roller operated cable retaining dogs 213 (Fig. 2) which are pivotally mounted on brackets 214 secured to the edge of a top plate 215 secured to the cable drum and spaced slightly more than the thickness of a cable above the lower shelf. During the rotation of the mount the cable retaining dogs are guided so that a pad portion 216 on each dog engages the outer coil of cable and holds the five cables together in side by side relationship. This feature is particularly illustrated at the left side of Fig. 4. The roller portion of each dog rides in engagement with a peripheral track 217 which at the point where the cables are drawn tangentially off of the lower shelf connects with an inclined ramp 218 comprising spaced curved guides which move the rollers first outwardly and then upwardly thus freeing the cables from the side pressure of pads 216. As the cables pass tangentially off of the lower shelf they are guided by a cable guide member 219 so as to pass over independently rotatable sheaves 220 being retained in contact with the sheaves by sets of idler rollers 221 and 222.

The independently rotatable sheaves are supported upon a bracket 223 which in turn is mounted upon the stationary structure of the ship, this may be accomplished by securing it to a pad 224 supported by the reel encircling shroud 225 (Fig. 4) or by supporting it from one of the several horizontally disposed channel members 226 which form a part of the supporting structure.

It will be apparent that as the cable reel rotates in one direction with the mount it will pay out slack which must be accommodated or else the cables are likely to become twisted and fouled, likewise reverse rotation of the mount will take up this slack. In order to provide a cable tensioning and slack accommodating means there is provided immediately under the rotatable sheaves 220 a cable receiving well 227 which may be secured to the stationary launcher hoist housing and comprises an elongated casing which is preferably divided into a plurality of narrow vertical chambers 228, etc., one for each cable and a portion of which is shown in vertical cross section in Fig. 6. An access plate 231 may be provided at one side to permit the installation of cable followers 232, one in each chamber. These cable followers may be of the construction illustrated wherein a centrally mounted loosely rotatable sheave 233 is supported between spaced follower side plates 234 and 235 to receive one of the cables. The weight of the follower assembly is sufficient to keep the cable taut at all times, however, additional weight may be added if desired. The cables after passing around their respective sheaves 233 extend upwardly to the outside of the cable well where they are clamped in place by a clamping means 236 from which they extend to a suitable connection box 237 (Fig. 5) on the hoist housing. In order to guide the follower in its vertical movement within the elongated chamber there are provided a plurality of edge rollers 238 and side rollers 239 which engage the inside walls of the elongated cable receiving chambers and reduce frictional contact therewith.

It will be understood that the present invention is not limited to the handling of electric cables but may advantageously be employed for the purpose of maintaining any relatively flexible cable or conduit members as pressure or drain lines, for example, in a desired disposition regardless of relative rotational movement of a plurality of structures to which such members are connected.

Obviously many modifications and variations of the present invention are possible in the light of the above teachings. It is therefore to be understood that within the scope of the appended claims the invention may be practiced otherwise than as specifically described.

What is claimed is:

1. A cable reel device for interconnecting a rotatable launcher mount with its supporting structure comprising; a supporting member, a cable encircling drum-shaped member secured to the supporting member, a cable shelf secured to said drum for supporting a portion of the cables for movement with the supporting member, a second cable shelf secured to said drum for receiving and paying out another portion of said cables, means for guiding said cables from said first cable shelf onto and off of the second cable shelf, a cable well into which the cables are fed when paying off of the second cable shelf, and cable tension means in the well to provide a constant tension on the portion of cable in the well.

2. A cable reel device for eliminating twisting, straining and chafing of cables interconnecting relatively movable members comprising; a supporting member, a drum-shaped member secured to the supporting member, a cable shelf secured to the drum for supporting a portion of the cables for movement with the supporting member, a second cable shelf secured to the drum for receiving from and paying out to said first cable shelf another portion of the cables, a cable well into which the cables are fed when paying off of the second shelf, and cable tension means in the well for eliminating any fouling of the cables.

3. A reeling device for cables which interconnect relatively rotatable members comprising; a cable drum member about which intermediate portions of the cables are coiled and which is secured to one rotatable member, a radially extending shelf secured to the drum for supporting a portion of the cables in side by side relationship for movement with the rotatable member, a second shelf secured to the drum for receiving the cables in side by side relationship as the drum rotates in one direction and for paying out the cables as the drum rotates in the opposite direction, spaced cable engaging dogs carried by the drum and movable into and out of cable engaging position as the cable feeds onto and off of the second cable shelf, a track for guiding the dogs into and out of cable engaging position, and a well disposed beneath the cable drum for receiving the slack as the cables reel off the second shelf.

4. A cable reel device for interconnecting a rotatable launcher mount with its supporting structure comprising; a supporting member, a cable encircling drum member secured to the supporting member, a cable shelf secured to said drum member for supporting a portion of the cables for movement with the supporting member, a second cable shelf secured to said drum member for receiving and paying out another portion of said cables, spaced cable engaging dogs carried by said drum member and movable into and out of cable engaging position as the cable feeds onto and off the second cable shelf, a track for guiding the dogs into and out of cable engaging position, and a well disposed beneath said drum member for receiving the slack as the cables reel off the second shelf.

5. A cable reel device as defined in claim 4 and further comprising cable tension means in the well for eliminating any fouling of the cable.

References Cited in the file of this patent

UNITED STATES PATENTS

| | | |
|---|---|---|
| 1,322,407 | Chegwidden et al. | Nov. 18, 1919 |
| 1,864,891 | Coberly et al. | June 28, 1932 |
| 2,010,006 | Bosch, Jr. | Aug. 6, 1935 |